United States Patent [19]
Sota et al.

[11] Patent Number: 6,039,782
[45] Date of Patent: Mar. 21, 2000

[54] PREPARING ORGANIC POWDER BY ANAEROBICALLY TREATING FERMENTATION WASTE FLUID AND AEROBICALLY TREATING THE DIGESTED FERMENTATION LIQUOR

[75] Inventors: Akio Sota, Kasukabe; Tomoo Okiura; Masaki Azuma, both of Tokyo, all of Japan

[73] Assignee: Kyowa Hakko Kogyo Co., Ltd., Tokyo, Japan

[21] Appl. No.: 09/008,296

[22] Filed: Jan. 16, 1998

[30] Foreign Application Priority Data

Jan. 29, 1997 [JP] Japan .................................. 9-015181

[51] Int. Cl.$^7$ .............................. C05F 11/08; C05F 1/00; C05F 7/00; C05B 9/00; A01N 25/00
[52] U.S. Cl. ............................. 71/10; 71/9; 71/15; 71/25; 71/33; 71/63; 71/64.03; 71/64.04; 71/64.05; 71/64.06
[58] Field of Search ............................... 71/9, 25, 15, 33, 71/63, 64.03–64.06; 426/2; 210/768

[56] References Cited

U.S. PATENT DOCUMENTS

| | | | |
|---|---|---|---|
| 3,973,043 | 8/1976 | Lynn | 426/55 |
| 4,067,801 | 1/1978 | Ishida et al. | 210/5 |
| 4,137,158 | 1/1979 | Ishida et al. | 71/10 |
| 4,162,153 | 7/1979 | Spector | 71/12 |
| 4,354,936 | 10/1982 | Ishida et al. | 210/602 |
| 4,526,791 | 7/1985 | Young | 426/53 |
| 4,604,125 | 8/1986 | Robertiello et al. | 71/26 |
| 5,622,710 | 4/1997 | Binder et al. | 424/438 |

OTHER PUBLICATIONS

Browning, J., "Agglomeration", Chemical Engineering, p147, 154–155, Dec. 1967.

Chemical Engineering Report, Agglomeration, p 161–164, Oct. 1951

*Primary Examiner*—Gary P. Straub
*Assistant Examiner*—Cam N. Nguyen
*Attorney, Agent, or Firm*—Fitzpatrick, Cella, Harper & Scinto

[57] ABSTRACT

The present invention relates to a process for producing granulated organic matters wherein a precipitated fraction obtaied in a settling tank from a methane fermentation fluid having been treated aerobically in an aeration tank is added to a fermentation waste fluid. According to the present invention, there is provided a process for producing physically stable granulated organic matters with reduced increase of stickiness occurring at the time of manufacturing granulated organic matters from fermentation waste fluid.

28 Claims, No Drawings

PREPARING ORGANIC POWDER BY ANAEROBICALLY TREATING FERMENTATION WASTE FLUID AND AEROBICALLY TREATING THE DIGESTED FERMENTATION LIQUOR

BACKGROUND OF THE INVENTION

The present invention relates to a process for producing granulated organic matters by use of fermentation waste fluids treated by addition of methane fermentation materials. These granulated organic matters are useful as organic fertilizers.

Because fermentation waste fluids are rich in fertilizer components such as nitrogen, phosphoric acid and potassium and in organic matters necessary for plant growth, such as sugars, amino acids and vitamins they are useful as raw materials of fertilizers, but if concentrated at high concentration, they turn into materials with extremely high stickiness or viscosity due to the influence of high molecular weight organic matters such as polysaccharides derived from molasses etc. contained in fermentation waste fluids.

Production of organic fertilizers using such fermentation waste fluids suffers from problems resulting from said stickiness, such as occurrence of scaling at the time of drying, incapability of granulation.

Heretofore, a wide variety of techniques of reducing the stickiness of fermentation waste fluids have been examined. Examples include a method of adding mineral acids and subsequent heating (Japanese Published Examined Patent Application No. 16332/69), a method of mixing with chicken droppings (Japanese Published Examined Patent Application No. 12243/70), a method of adding lime and subsequent drying (Japanese Published Unexamined Patent Application No. 121060/75), and a method of drying fermentation waste fluid along with silicate (Japanese Published Unexamined Patent Application No. 167292/89).

However, the prior art techniques are practically unrealistic methods because of drawbacks such as complicated processes and inferior productivity, occurrence of smells at the time of drying, etc. or industrially disadvantageous techniques because fertilizer components are rendered scarce by use of additives which is unnecessary as fertilizer components.

At present, there is employed a method (referred to hereinafter as sulfuric acid addition method) which involves adding conc. sulfuric acid to concentrated fermentation waste fluid from molasses (concentration of sulfuric acid: 10to30%), then heating it for several hours (temperature: 100 to 105° C.) thus converting soluble organic matters (sugars etc.) in the waste fluid into humus substance to improve physical properties, and drying and solidifying it (Japanese Published Unexamined Patent Application No. 18657/74). However, this sulfuric acid addition method requires enormous costs for facilities etc. in order to carry out the step of treatment with sulfuric acid, so there is demand for an economical process for producing physically stable granulated organic matters.

SUMMARY OF THE INVENTION

An object of the present invention is to provide a process for producing physically stable granulated organic matters with a reduced increase of stickiness occurring at the time of manufacturing granulated organic matters from fermentation waste fluids.

The present inventors extensively examined various methods to achieve an effect equivalent to or higher than that of the sulfuric acid addition method, and as a result, they found that such a method could be provided by adding methane fermentation materials, to arrive at the present invention.

The present invention relates to a process for producing granulated organic matters wherein a precipitated fraction (referred to hereinafter as "sludge"), obtained in a settling tank from a methane fermentation fluid having been treated aerobically in an aeration tank, is added to a fermentation waste fluid.

DETAILED DESCRIPTION OF THE INVENTION

The fermentation waste fluid includes various fermentation waste fluids such as waste fluids from alcohol fermentation, fermentation waste fluid using yeast, waste fluids from amino acid fermentation such as glutamic acid, lysine or ornithine fermentation, waste fluids from organic acid fermentation such as citric acid or gluconic acid fermentation.

Specific examples of such fermentation waste fluids include alcohol fermentation waste fluids with a total solid content of 8 to 9%, prepared by the process in which yeasts (*Saccharomyces cerevisiae* etc.) are cultivated in a medium containing 10 to 30% molasses waste and 0.1 to 0.5% ammonium sulfate at 20 to 35° C. for 3 to 7 days, and the culture is single-distilled in a column plate type, bubble cap type or Super-Allospase type distillation column, and alcohol is distilled and separated from the distillate; and amino acid fermentation waste fluids prepared by the process in which glutamic acid-producing microorganisms (e.g. *Corynebacterium glutamicum* etc.) are cultivated in a medium containing 10 to 25% molasses waste, 0.05 to 0.5% monoammonium phosphate, and 0.05 to 0.5% diammonium phosphate under an aeration rate of 0.1 to 1 vvm, stirring at 50 to 100 rpm, at 25 to 40° C. for 1 to 4 days, and the culture concentrated, and sulfuric acid, or the like., is added to the concentrate to precipitate and remove glutamic acid. Further, concentrated waste fluids obtained by concentrating said fermentation waste fluids are preferably used, and said concentrated waste fluids include e.g. fermentation waste fluids concentrated such that their total solid content reaches 20 to 60%.

The methane fermentation fluid used may be any methane fermentation fluid obtained by methane fermentation. Examples are methane fermentation fluids obtained by subjecting to methane fermentation the above-described fermentation waste fluids and factory drain from processes for the manufacture of beer, foods etc. Specifically, such methane fermentation fluids are obtained by subjecting the above-described fermentation fluids to methane fermentation at 30 to 60° C. for 3 days to 2 weeks. Preferable methane fermentation fluids are those obtained by subjecting alcohol fermentation fluids to methane fermentation at 30 to 60° C. for 3 days to 2 weeks.

The sludge to be added includes a precipitated fraction obtained by subjecting the above methane fermentation fluid to aeration treatment at an aeration rate of 0.2 to 1.2 vvm for 1 to 7 days and introducing it into a settling tank, preferably sludge etc. with a solid content of 15 to 55% obtained by dehydrating said fraction in a decanter, or drying it in the sun.

The amount of said sludge to be added is 30 to 200 W/W %, preferably 50–100 W/W %, in terms of solid content based on said fermentation waste fluid or said concentrate.

The fermentation waste fluid to which the sludge had been added is granulated and dried in the usual manner using a pan-type granulator etc. whereby granulated organic matters can be obtained.

If the granulated organic matters are used as fertilizer, said granulated organic matters can be used as such, or granulated organic matters prepared by adding an inorganic fertilizer to the fermentation waste fluid containing the sludge and then granulating and drying it in the same manner as above, can be used as fertilizer.

The inorganic fertilizer added includes phosphorus-containing compounds such as phosphoric acid, diammonium phosphate, double superphosphate of lime and superphosphate of lime, potassium-containing compounds such as potassium sulfate and potassium chloride, nitrogen-containing compounds such as ammonium sulfate, ammonium chloride and urea, and magnesium sulfate.

The amount of inorganic fertilizer added may be varied depending on the object. For example, the inorganic fertilizer is added in an amount such that the ratio of the total solid content in the above fermentation waste fluid and precipitated fraction to the solid content in the inorganic fertilizer consisting of nitrogen, phosphoric acid and potassium is 2:3, while the contents of nitrogen, phosphoric acid and potassium are finally 8% respectively.

According to the present invention, there is provided a process for producing physically stable granulated organic matters with reduced increase of stickiness occurring at the time of manufacturing granulated organic matters from fermentation waste fluids.

EXAMPLES

Hereinafter, the present invention is described in more detail with reference to the following examples, which however are not intended to limit the scope of the present invention. Unless otherwise indicated, all parts and percentages are by weight.

Example 1

(1) Preparation of Fermentation Waste Fluids and Fermentation Concentrates

To confirm the effect of addition of sludge at the time of dehydration and drying of fermentation waste fluids, various fermentation waste fluids and fermentation concentrates were obtained in the following manner.

(I) Preparation of Alcohol Fermentation Waste Fluid and the Concentrate Thereof

*Saccharomyces cerevisiae* was cultivated in a medium containing 20% molasses waste and 0.1% ammonium sulfate at 30° C. for 4 days to obtain a fermentation fluid.

This fermentation fluid was single-distilled in a Super-Allospase type distillation column where alcohol was distilled and separated, to give an alcohol fermentation fluid with a total solid content of 8 to 9%.

This alcohol fermentation waste fluid was concentrated until its total solid content reached 40% whereby an alcohol fermentation concentrate was obtained.

(II) Preparation of Glutamic Acid Fermentation Waste Fluid and the Concentrate Thereof

*Corynebacterium glutamicum* was cultivated in a medium containing 18% molasses waste, 0.1% monoammonium phosphate and 0.1% diammonium phosphate at an aeration rate of 0.2 vvm, 75 rpm, 35° C. for 2 days, and the resulting culture was concentrated followed by adding sulfuric acid, or the like, to the concentrate to precipitate and remove glutamic acid from it whereby a glutamic acid fermentation waste fluid was obtained. This glutamic acid fermentation waste fluid was concentrated until its total solid content reached 35% whereby an glutamic acid fermentation concentrate was obtained.

(2) Preparation of Sludge

The alcohol fermentation waste fluid obtained in (1)-(I) above was subjected to methane fermentation at 50 to 60° C. for 10 days and subjected to aeration treatment at 35 to 40° C. at an aeration rate of 1000 $Nm^3$/hour. The solution thus treated was fed continuously to a settling tank and a precipitated fraction was obtained. The precipitated fraction was dried in the sun whereby sludge with a solid content of 48% was obtained.

(3) Examination of the Effect of Addition of Sludge at the Time of Drying

A 30-L stainless kneader with stirring blades was charged with 10 kg (in terms of solid content) of each of the 8 dried materials shown in Table 1 and the material was stirred and dried while being heated with steam.

As dehydration of the dried material proceeds during this treatment, the viscosity of the dried material is increased depending on the physical properties of said material. Therefore, the physical properties of said material can be evaluated from the increase in supplying electricity power to the stirring machine due to an increase in its viscosity, as well as from stickiness of its scale onto the apparatus at the time of dehydration, and from its pulverization state.

The effect of addition of the sludge obtained by said process is shown in Table 1.

TABLE 1

Effect of addition of sludge to fermentation waste fluids at the time of drying

| | dried material | | |
|---|---|---|---|
| concentrate | amount of sludge added*[1] | addition of inorganic fertilizer*[2] | State at the time of drying |
| 1. alcohol fermentation concentrate | 0 | no | It turns into a viscous substance at a water content of 10% or less. High scaling onto the apparatus. |
| 2. alcohol fermentation concentrate | 30% | no | Slight scaling at a water content of 10% or less. It has stickiness. |
| 3. alcohol fermentation concentrate | 100% | no | It turns into powder at a water content of 20% or less. No scaling onto the apparatus. |
| 4. alcohol fermentation concentrate | 0 | yes | High stickiness at a water content of 10% or less. High scaling. |
| 5. alcohol fermentation concentrate | 100% | yes | It turns into powder at a water content of 8% or less. No scaling onto the apparatus. |
| 6. glutamic acid fermentation concentrate | 0 | no | It turns into a viscous substance at a water content of 5% or less. High scaling onto the apparatus. |
| 7. glutamic acid fermentation concentrate | 50% | no | It turns into powder at a water content of 15% or less. No scaling onto the apparatus. |

TABLE 1-continued

Effect of addition of sludge to fermentation waste fluids at the time of drying

| concentrate | amount of sludge added*1 | addition of inorganic fertilizer*2 | State at the time of drying |
|---|---|---|---|
| 8. fermentation waste is not used | sludge only | no | It turns into powder at a water content of 35% or or less. No scaling. |

Amount of sludge added
*1: Amount relative to the contentrate, where 100% means addition of a volume equal to the concentrate. Addition of inorganic fertilizer
*2: The inorganic fertilizer is added in an amount such that the ratio of the total solid content in the concentrate and sludge to the solid content of the inorganic fertilizer consisting of nitrogen, phosphoric acid and potassium is 2:3 while the contents of nitrogen, phosphoric acid and potassium are finally about 8% respectively.

If the sludge was not added, it was not possible to obtain powder from the dried material, while by addition of the sludge, the power supply to the stirring machine could be decreased, the stickiness and/or viscosity of the dried material could be prevented from raising, and powder could be obtained.

Example 2

The physical properties of an organic matter-containing compound fertilizer prepared by adding the sludge of the present invention were compared with those of an organic matter-containing compound fertilizer prepared according to the conventional method using sulfuric acid.

Preparation of an organic matter-containing compound fertilizer (referred to hereinafter as sulfuric acid-treated fertilizer) according to the conventional method was carried out as follows:

A glutamic acid fermentation waste fluid obtained in the same manner as in Example 1-(1)-(II) was further concentrated until its total solid content reached 52% whereby a concentrate was obtained.

Conc. sulfuric acid (15 parts) was added to said concentrate (100 parts), and the mixture was treated by heating it at 105° C. for 5 hours.

The solution thus treated was neutralized with ammonia, and the inorganic fertilizer was added according to the method described in Table 1 in Example 1 and the mixture was granulated and dried in a pan-type granulator, whereby a sulfuric acid-treated fertilizer with a solid content of 52% from the fermentation waste fluid was obtained.

An organic matter-containing compound fertilizer to which the sludge was added (referred to hereinafter as sludge-added fertilizer) was prepared as follows:

A concentrate of the same type as that used above in producing the organic matter-containing compound fertilizer according to the conventional process was used, but at 32% solid content, without treatment with sulfuric acid, and the sludge was added thereto at 20% in terms of solid content, and its total solid content was adjusted to the same level (52%) as in the sulfuric acid-treated fertilizer, whereby a fertilizer was prepared. The inorganic fertilizer was added to said preparation, according to the method described in Table 1 in Example 1 and the mixture was granulated and dried in the same manner as for the sulfuric acid-treated fertilizer, whereby a sludge-added fertilizer with a solid content of 52% from the fermentation waste fluid was obtained.

The physical properties of the sludge-added fertilizer prepared by adding the sludge of the present invention were compared with those of the sulfuric acid-treated fertilizer prepared according to the conventional method using sulfuric acid. The results are shown in Table 2.

TABLE 2

Physical properties of the organic matter-containing compound fertilizer produced by the method of the invention

| Products | Humus Content*1 | Hardness (kg/particle) | Moisture Absorption*2 after a lapse of each of the following periods | | | |
|---|---|---|---|---|---|---|
| | | | 0 hrs | 24 hrs | 48 hrs | 72 hrs |
| sludge-added fertilizer | 10.3% | 5.7 | 1.8% | 3.4% | 6.3% | 7.8% |
| sulfuric acid-treated fertilizer | 9.5% | 5.0 | 1.7% | 6.0% | 9.6% | 12.2% |

Humus content*1: acid insoluble, alkali-soluble substance.
Moisture absorption*2: Change with time in water content at 25° C. under 80% relative humidity.

As is evident from Table 2, the sludge-added fertilizer of the present invention was found to be a fertilizer containing humus materials at a similar level and having excellent physical properties with significantly less moisture absorption, as compared with the conventional sulfuric acid-treated fertilizer.

Example 3

An alcohol fermentation concentrate (7.5 kg) with a total solid content of 40.2 w/w % prepared according to the method described in Example 1-(1)-(I), sludge(8.5 kg) prepared according to the method described in Example 1-(2), and a phosphoric acid solution for fertilizer (1.7 kg, 52% $P_2O_5$) were introduced into a 30-L mixing machine equipped with a jacket. Then, the mixture was stirred to give pH-adjusted slurry.

To said slurry were added ammonium sulfate (6.1 kg), diammonium phosphate for fertilizer (1.2 kg), potassium chloride for fertilizer (2.2 kg), superphosphate of lime (0.6 kg) and magnesium sulfate for fertilizer (0.8 kg). The mixture was then stirred and dried while being heated with steam to give 19.1 kg of a powder with a water content of 5.2%.

Water (10 parts) was added to said powder (100 parts) so that its water content was adjusted to 14%, and it was then granulated in a small pan-type granulator and thereafter dried to give 18 kg of an organic matter-containing compound fertilizer.

The results of analysis of the organic matter-containing compound fertilizer are shown in Table 3.

TABLE 3

| water content | | 1.8% |
|---|---|---|
| distribution of particle diameter | less than 1.5 mm | 32.5% |
| | 1.5 mm to 3 mm | 40.7% |
| | more than 3 mm | 27.8% |
| hardness of particles | 5.5 kg/particle in average (diameter of 1.5 mm to 3 mm) | |
| moisture absorption*1 | | 7.8% |
| fertilizer | total nitrogen | 8.6% |

TABLE 3-continued

| components | | |
|---|---|---|
| | ammoniacal nitrogen | 6.7% |
| | total phosphoric acid | 8.8% |
| | citric acid-soluble phosphoric acid | 8.2% |
| | water-soluble potassium | 8.4% |
| | citric acid-soluble magnesium | 2.8% |
| pH | | 5.3 |

Moisture absorption*1: As determined after 72 hours at 25° C. under 80% relative humidity.

Example 4

Sludge with a solid content of 18.5% was prepared according to the same method as in Example 1-(2) except that a decanter was used for dehydration in place of drying in the sun after separation by precipitation. 110 kg of this sludge and 6.6 kg of a phosphoric acid solution for fertilizer (52% $P_2O_5$) were added to an alcohol fermentation concentrate(100 kg) with a total solid content of 20.5 w/w % prepared according to the method described in Example 1-(1)-(I), and pH-adjusted slurry (pH 5.2 with a total solid content of 19.5%) was obtained according to the same manner as in Example 3.

The slurry was dried using a drum drier with a heating surface of 0.5 $m^2$ in steam (steam pressure, 3 kg/$cm^2$; slurry feed rate, 40 kg/hr) to give 21 kg of dried powder.

The results of analysis of the dried powder are shown in Table 4.

TABLE 4

| water content | 11.3% |
|---|---|
| total nitrogen | 2.2% |
| total phosphoric acid | 8.3% |
| total potassium | 4.8% |
| pH | 5.2 |

The dried powder (10 kg), ammonium sulfate (5.8 kg), diammonium phosphate for fertilizer (1.2 kg), potassium chloride for fertilizer (2.0 kg), superphosphate of lime (0.7 kg) and magnesium sulfate (6 kg) were introduced into a hammer type grinder and mixed to give a fertilizer powder preparation.

Water was added to the fertilizer powder preparation until its water content reached 15%, and it was mixed in a mixer and granulated in a pan-type granulator to give 7 kg of a granulated compound fertilizer containing organic matters and having particles of 1.5 to 3.0 mm in diameter.

The results of analysis of said organic matter-containing compound fertilizer are shown in Table 5.

TABLE 5

| water content | 1.8% |
|---|---|
| total nitrogen | 8.3% |
| ammoniacal nitrogen | 6.5% |
| total phosphoric acid | 8.3% |
| citric acid-soluble phosphoric acid | 8.5% |
| total potassium | 8.8% |
| pH | 5.4 |

Example 5

Sludge (125 kg, total solid content: 19%) prepared according to Example 4, a phosphoric acid solution (6.3 kg), ammonium sulfate (33.1 kg), potassium chloride (11.6 kg), and diammonium phosphate (7.5 kg) were added to a glutamic acid fermentation concentrate (100 kg, total solid content: 35%, total nitrogen: 3.4%, and total potassium: 1.4%) prepared according to Example 1-(1)-(II), and mixed with stirring to give slurry with a water content of 59%.

The slurry was dried using a drum drier in the same manner as in Example 4 to give 98 kg of a powder (water content, 6.3%).

The slurry (20 parts) before drying was added to said dried powder (100 parts) and mixed in a mixer, then granulated in a pan-type granulator and dried to give 35 parts of granulated organic matter-containing compound fertilizer (particle diameter: 1.5 mm to 3 mm).

The results of analysis of this organic matter-containing compound fertilizer are shown in Table 6.

TABLE 6

| water content | 1.9% |
|---|---|
| hardness | 4.2 kg/particle |
| total nitrogen | 10.6% |
| ammoniacal nitrogen | 8.6% |
| total phosphoric acid | 6.7% |
| citric acid-soluble phosphoric acid | 6.2% |
| total potassium | 7.4% |
| pH | 4.9 |

What is claimed is:

1. A process for producing granulated organic matter comprising the steps of:
   (a) obtaining a fermentation waste fluid;
   (b) anaerobically fermenting said fermentation waste fluid to obtain a digested fermentation liquor;
   (c) aerobically treating said digested fermentation liquor;
   (d) subjecting the aerobically treated digested fermentation liquor to precipitation to obtain a precipitated fraction;
   (e) drying or dehydrating the precipitated fraction;
   (f) blending the dried or dehydrated precipitated fraction with a fermentation waste fluid which has not been aerobically treated; and
   (g) granulating the blended fermentation waste fluid and precipitated fraction obtained from step (f).

2. A process according to claim 1, wherein the fermentation waste fluid which has not been aerobically treated is concentrated until its solid content reaches 20 to 60%.

3. A process according to claim 1 or 2, wherein after the precipitated fraction is blended with the non-aerobically treated fermentation waste fluid, an inorganic fertilizer is added.

4. A process according to claim 3, wherein the non-aerobically treated fermentation waste fluid is an alcohol fermentation waste fluid.

5. A process according to claim 4, wherein the precipitated fraction is dried or dehydrated until its solid content reaches 15 to 55%.

6. A process according to claim 5, wherein after the precipitated fraction is blended with the non aerobically treated fermentation waste fluid, an inorganic fertilizer is added.

7. A process according to claim 6, wherein the inorganic fertilizer comprises at least one inorganic fertilizer selected from the group consisting of phosphoric acid, diammonium phosphate, double superphoshate of lime, superphosphate of lime, potassium sulfate, potassium chloride, ammonium sulfate, ammonium chloride, urea and magnesium sulfate.

8. An organic fertilizer comprising granulated organic matters obtained by the process described in claim 7.

9. A process according to claim 3, wherein the fermentation waste fluid is subjected to anaerobic fermentation at 30 to 60° C. for 3 days to two weeks.

10. A process according to claim 9, wherein the digested fermentation liquor is aerobically treated at an aeration rate of 0.2 to 1.2 vvm for 1 to 7 days.

11. A process according to claim 10, wherein the precipitated fraction is blended with the non-aerobically treated fermentation waste fluid in an amount of 30–200 W/W %.

12. A process according to claim 11, wherein the precipitated fraction is blended with the non-aerobically treated fermentation waste fluid in an amount of 50–100 W/W %.

13. A process according to claim 3, wherein the precipitated fraction is dried or dehydrated until its solid content reaches 15 to 55%.

14. A process according to claim 13, wherein after the precipitated fraction is blended with the non-aerobically treated fermentation waste fluid, an inorganic fertilizer is added.

15. A process according to claim 14, wherein the inorganic fertilizer comprises at least one inorganic fertilizer selected from the group consisting of phosphoric acid, diammonium phosphate, double superphosphate of lime, superphosphate of lime, potassium sulfate, potassium chloride, ammonium sulfate, ammonium chloride, urea and magnesium sulfate.

16. An organic fertilizer comprising granulated organic matters obtained by the process described in claim 15.

17. An organic fertilizer comprising granulated organic matters obtained by the process described in claim 14.

18. A process according to claim 3, wherein the fermentation waste fluid is anaerobically fermented at 30 to 60° C. for 3 days to 2 weeks.

19. A process according to claim 18, wherein the non-aerobically treated fermentation waste fluid is an alcohol fermentation fluid.

20. An organic fertilizer comprising granulated organic matters obtained in a process as described in claim 3.

21. A process according to claim 4, wherein the fermentation waste fluid is subjected to anaerobic fermentation at 30 to 60° C. for 3 days to two weeks.

22. A process according to claim 21, wherein the digested fermentation liquor is aerobically treated at an aeration rate of 0.2 to 1.2 vvm for 1 to 7 days.

23. A process according to claim 22, wherein the precipitated fraction is blended with the non-aerobically treated fermentation waste fluid in an amount of 30–200 W/W %.

24. A process according to claim 23, wherein the precipitated fraction is blended with the non-aerobically treated fermentation waste fluid in an amount of 50–100 W/W %.

25. An organic fertilizer comprising granulated organic matters obtained in a process as described in claim 4.

26. An organic fertilizer comprising granulated organic matters obtained in a process as described in claim 5.

27. An organic fertilizer comprising granulated organic matters obtained by the process described in claim 6.

28. An organic fertilizer comprising granulated organic matters obtained in a process as described in claim 1 or 2.

* * * * *

UNITED STATES PATENT AND TRADEMARK OFFICE
CERTIFICATE OF CORRECTION

PATENT NO.   : 6,039,782
DATED        : March 21, 2000
INVENTOR(S)  : AKIO SOTA ET AL.

It is certified that error appears in the above-identified patent and that said Letters Patent is hereby corrected as shown below:

ON THE COVER PAGE

[57] In the Abstract,
    Line 3, "obtaied" should read --obtained--.

COLUMN 1

Line 16, "vitamins" should read --vitamins,--;
    Line 26, "of" (second occurrence) should read
    --for--;
    Line 42, "is" should read --are--; and
    Line 49, "10to30%)," should read --10 to 30%),--.

COLUMN 4

Line 1, "an" should read --a--.

COLUMN 5

Table 1, "concentrate. Addition" should read
    --concentrate. ¶Addition--.

UNITED STATES PATENT AND TRADEMARK OFFICE
CERTIFICATE OF CORRECTION

PATENT NO. : 6,039,782
DATED : March 21, 2000
INVENTOR(S) : AKIO SOTA ET AL.

It is certified that error appears in the above-identified patent and that said Letters Patent is hereby corrected as shown below:

COLUMN 6

Table 2, "acid insoluble," should read --acid-insoluble,--.

COLUMN 8

Line 57, "non aerobically" should read --non-aerobically--.

Signed and Sealed this

Third Day of April, 2001

Attest:

NICHOLAS P. GODICI

Attesting Officer     Acting Director of the United States Patent and Trademark Office